United States Patent
Qi et al.

(10) Patent No.: US 12,147,259 B2
(45) Date of Patent: Nov. 19, 2024

(54) DISTRIBUTED COLLABORATIVE CONTROL METHOD FOR MICROGRID FREQUENCY UNDER ATTACK OF FALSE DATA INJECTION BASED ON CYBER-PHYSICAL FUSION

(71) Applicant: ZHEJIANG UNIVERSITY, Hangzhou (CN)

(72) Inventors: Donglian Qi, Hangzhou (CN); Jingcheng Mei, Hangzhou (CN); Jianliang Zhang, Hangzhou (CN); Yulin Chen, Hangzhou (CN); Zhenyu Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 824 days.

(21) Appl. No.: 17/329,204

(22) Filed: May 25, 2021

(65) Prior Publication Data
US 2022/0342435 A1 Oct. 27, 2022

(30) Foreign Application Priority Data

Apr. 22, 2021 (CN) .......................... 202110434398.X

(51) Int. Cl.
*G06F 30/20* (2020.01)
*G05B 17/02* (2006.01)
(Continued)

(52) U.S. Cl.
CPC .............. *G05F 1/66* (2013.01); *G05B 17/02* (2013.01); *G06F 30/20* (2020.01); *H02J 3/38* (2013.01);
(Continued)

(58) Field of Classification Search
CPC .... G05F 1/66; G05B 17/02; H02J 3/38; H02J 2203/20; H04L 41/145
See application file for complete search history.

(56) References Cited

PUBLICATIONS

Liu, Centralized Fault Management Approach for the Protection of Smart Grids, 2015 (Year: 2015).*
(Continued)

*Primary Examiner* — Juan C Ochoa
*Assistant Examiner* — Michael Paul Mirabito
(74) *Attorney, Agent, or Firm* — W&G Law Group

(57) ABSTRACT

A simulation method of distributed collaborative control for a microgrid under the attack of false data injection based on cyber-physical fusion is provided, which includes: establishing a distributed collaborative control simulation model for the microgrid frequency based on an RT_LAB real-time simulation tool OPAL-RT; designing a distributed collaborative control algorithm of a microgrid under the attack of false data injection based on DSP; simulating real-time communication among distributed generations based on an OPNET; simulating constant injection of false data, to realize that the frequency of each distributed generation in the microgrid is finally strictly tracked to the reference frequency. According to the method provided by the present application, no extra state observer is needed to observe the angular frequency states of local and neighboring nodes, so that the adverse effects caused by the attack of false data with a constant injection can be completely eliminated.

4 Claims, 2 Drawing Sheets

(51) Int. Cl.
  *G05F 1/66* (2006.01)
  *H02J 3/38* (2006.01)
  *H04L 41/14* (2022.01)
  *G06F 113/04* (2020.01)

(52) U.S. Cl.
  CPC ........ *H04L 41/145* (2013.01); *G06F 2113/04* (2020.01); *H02J 2203/20* (2020.01)

(56) References Cited

PUBLICATIONS

Hossein, Analysis and Control of a Microgrid with Converter Fed Distributed Energy Sources, Dec. 2012 (Year: 2012).*
Li, Modeling and Control of Renewable Energy in Grids and Microgrids, Jan. 2020 (Year: 2020).*
Liu, Centralized Fault Management Approach for the Protection of Smart Grids (Year: 2015).*
Mustafa, Detection and Mitigation of Data Manipulation Attacks in AC Microgrids, Dec. 6, 2019 (Year: 2019).*
A Cyber-Secure Distributed Control Architecture for Autonomous AC Microgrid, Sep. 14, 2020 (Year: 2020).*

* cited by examiner

DISTRIBUTED COLLABORATIVE CONTROL METHOD FOR MICROGRID FREQUENCY UNDER ATTACK OF FALSE DATA INJECTION BASED ON CYBER-PHYSICAL FUSION

This application is a continuation of Chinese Patent Application No. 202110434398.X, filed on Apr. 22, 2021, which is hereby incorporated by reference in its entirety.

TECHNICAL FIELD

The present application relates to the technical field of distributed collaborative control for the microgrid, in particular to a distributed collaborative control method for microgrid frequency under the attack of false data injection based on cyber-physical fusion.

BACKGROUND

With the wide access of distributed generators (DGs) and the continuous development of intelligent power grid construction, distribution network has gradually become an active, controllable and flexible active distribution network cyber-physical system (CPS). The development of the active distribution network CPS not only improves the control ability for the distribution network, but also provides conditions for the construction of the power CPS. However, the sensing layer and control layer constructed by intelligent devices are at high risk of network attack due to their wide coverage and large installation amount, which is specifically reflected by frequent occurrence of security incidents of global power secondary system networks. Therefore, the network security of the active distribution network CPS is very important for its further development. As an important part of the active distribution network CPS, a microgrid also inherits related characteristics. In the operation control of the microgrid, a distributed control mode has gradually replaced a centralized control mode with its advantages of flexibility, high reliability and scalability. However, distributed control is vulnerable to network attacks because it involves many control decisions and information and communication technologies. Minor degree network attacks may lead to unrealizable control goal of the control algorithm, which will lead to the deviation of the frequency and voltage of the microgrid. Sever degree network attacks may lead to the collapse of the microgrid and bring serious economic losses. Therefore, in order to eliminate the damage caused by attacks, it is of great practical significance to study distributed control algorithms that can resist attacks.

Among many types of attacks, the attack of false data injections can exert attack without causing tracking errors of distributed controllers, which is difficult to be directly detected and eliminated by controllers. Taking the FDI attack with a constant injection amount (referred to as constant attack) as the research object, based on a property that the constant differential is 0, the present application designs a distributed collaborative control method for resisting the FDI attack, which can completely eliminate the influence of the constant attack on the system and can cope with all DG attacks without the need of establishing a complex evaluation mechanism, and does not rely on any state observers.

SUMMARY

To solve the above problems, A distributed collaborative control method for microgrid frequency under attack of false data injection based on cyber-physical fusion is provided according to the present application, so as to achieve the distributed collaborative control for microgrid frequency under the attack of false data injection and achieve a purpose of finally controlling microgrid frequency to a given frequency.

The present application adopts the following technical solution to achieve the above purpose.

A distributed collaborative control method for microgrid frequency under an attack of false data injection based on cyber-physical fusion, includes the following steps:

S1, establishing a distributed collaborative control simulation model for a microgrid frequency based on a RT_LAB real-time simulation tool OPAL-RT;

S2, designing a distributed collaborative control algorithm for a microgrid under the attack of the false data injection based on a DSP;

S3, simulating a real-time communication among distributed generations based on OPNET; and S4, simulating constant injection of false data such that the microgrid frequency is strictly tracked to a reference frequency ultimately.

Furthermore, the step S1 specifically includes:

establishing a simulation model of a distributed generation cluster in a RT-LAB, realizing a physical mirror image of the cluster, and expanding a signal output port of the cluster by the target machine, wherein the simulation model includes two parts, a first part is a primary circuit module composed of a distributed generation with a voltage source converter (VSC) and a three-phase AC load of the microgrid, and a second part is a secondary control module composed of multiple distributed generation PWM pulse control modules.

Furthermore, the step S2 specifically includes:

acquiring analog quantity from the signal output port of the RT-LAB of the secondary control module by the DSP to realize a distributed collaborative control algorithm for the microgrid under the attack of false data injection, wherein a digital signal is uploaded to an operation control unit in the RT-LAB through a preset communication protocol.

Furthermore, in the step S2, the distributed collaborative control algorithm for the microgrid frequency under the attack of false data injection specifically includes:

in the microgrid, accessing the distributed generations to the microgrid through the VSC to supply power to the microgrid, and controlling active power and reactive power of an output of the VSC by a traditional droop control method;

$$\begin{cases} \omega_i = \omega_{n,i} - m_{p,i}P_i \\ U_{mag,i} = U_{n,i} - n_{q,i}Q_i \end{cases} \quad (1)$$

where $\omega_i$ and $U_{mag,i}$ are an angular frequency and a voltage of an output of an inverter i respectively, $P_i$ and $Q_i$ are an active power and a reactive power of the output of the inverter i respectively; $m_{p,i}$ and $n_{q,i}$ respectively are active droop coefficient and reactive droop coefficient of the inverter i, which are obtained by a rated value of the inverter; $\omega_{n,i}$ and $U_{n,i}$ are an angular frequency and a voltage set point of the inverter i respectively.

Droop control will lead to frequency and voltage deviations, so a secondary control is needed to make compensation. The secondary control is intended to restore a frequency and a voltage to a normal working range by adjusting the angular frequency and the voltage set point. Only distributed collaborative control under attack is analyzed in the present application. Thus, a control objective is that in the case of attack, a secondary control algorithm is designed to satisfy a following formula:

$$\lim_{t \to \infty} |\omega_i - \omega_{ref}| = 0 \qquad (2).$$

In the formula (2), $\omega_i$ is an angular frequency of the $i^{th}$ distributed generation; $\omega_{ref}$ is a reference angular frequency; and t denotes a control time.

In order to achieve the above control objective by using distributed collaborative control, an auxiliary controller needs to be designed to obtain a control input $\omega_{n,i}$ in Formula (2). The Formula (1) is differentiated as:

$$\dot{\omega}_i = \dot{\omega}_{n,i} - m_{p,i}\dot{P}_i = u_i \qquad (3).$$

In the formula (3), $\dot{\omega}_i$, $\dot{\omega}_{n,i}$ and $\dot{P}_i$ are differentials of $\omega_i$, $\omega_{n,i}$ and $P_i$; $u_i$ is a control rate of the distributed collaborative control algorithm against the attack of false data injection.

$$u_i = -k_\omega \int [\Sigma_{j \in N_i} a_{i,j}(\omega_i - \omega_j) + b_i(\omega_i - \omega_{ref})] dt - \omega_i \qquad (4)$$

In the formula (4), $k_\omega$, $a_{i,j}$, $b_i$ are all control coefficients, $\omega_i$ is an angular frequency of the $i^{th}$ distributed generation, $\omega_j$ is an angular frequency of the $j^{th}$ distributed generation, and $N_i$ is a set of distributed generations collaborating with the distributed generation i; the design of the above control rate is capable of eliminating the influence on the secondary control when the false data injection is a constant.

Furthermore, in step S3, the OPNET acts as a router for simulating signal transmission and reception among distributed generation controllers DSPs, to realize physical topology simulation and realize interaction of a frequency collaborative control signal of a distributed generation unit.

Furthermore, the step S4 specifically includes:

specifying a secondary control attack value for the microgrid frequency by a platform model, simulating the false data injection, and transmitting a frequency fluctuation value to a DSP controller by the RT-LAB simulation model; performing a distributed generation frequency secondary control algorithm in the DSP controller; transmitting the control signal back to RT-LAB simulation model, so as to realize a distributed collaborative control for the microgrid frequency under the attack of false data injection.

According to the present application, a distributed collaborative control method for microgrid frequency under the attack of false data injection based on cyber-physical fusion is designed based on a cyber-physical fusion simulation platform. The cyber-physical fusion simulation platform mainly includes an RT_LAB simulation model, a DSP controller and an OPNET network simulation unit. Through the mathematical modeling of each power model, model constructing is completed in the RT-LAB, thereby realizing physical mirror image thereof and expanding the signal output port thereof by using the target machine. The ADC port of the DSP controller collects analog quantity from the signal output port. The analog quantity is calculated in a distributed photovoltaic power control collaborative algorithm, and then the results are output to the RT_LAB simulation model through a PWM port to realize collaborative control. The OPNET network simulation module plays the role of a switch and simulates various scenarios of network transmission. The validity of the distributed collaborative control method for microgrid under the attack of false data injection is verified.

The present application has the following beneficial effects.

The method based on the present application does not need to design complex parameters to evaluate the credibility of neighbor information, and does not rely on additional estimators or communication networks, which can completely eliminate the influence of distributed control for microgrid frequency in the case of the attack of false data injection, and can cope with all distributed generation attacks, and thus has high practicability.

DESCRIPTION OF EMBODIMENTS

Figure 1:
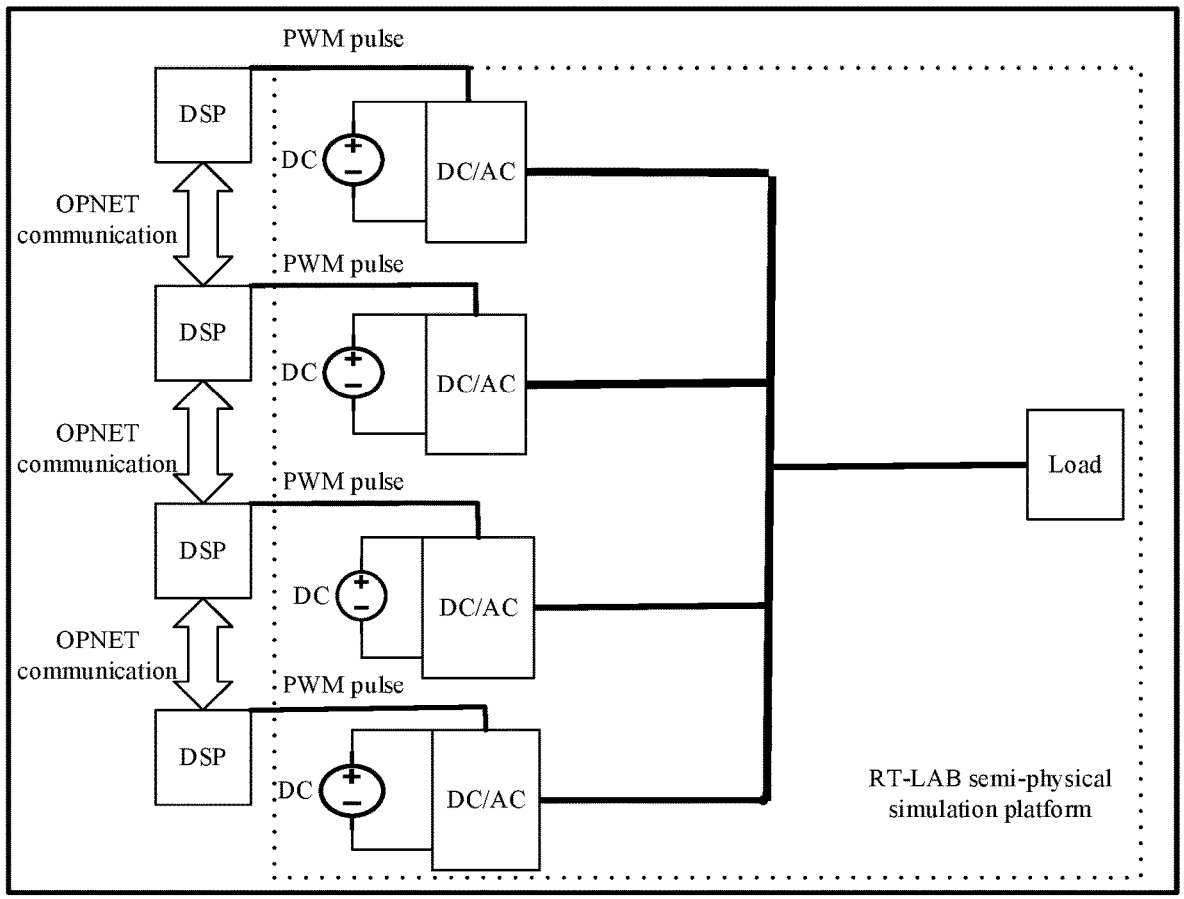
FIG. 1 is a structural diagram of a simulation system for distributed collaborative control based on cyber-physical fusion according to the present application.

The present application will be further described in detail with reference to the attached drawings and specific embodiments.

A distributed control method for microgrid frequency under attack of false data injection based on cyber-physical fusion is provided according to an embodiment, which includes the following steps.

Step 1: establishing a distributed collaborative control simulation model for a microgrid frequency based on a RT_LAB real-time simulation tool OPAL-RT.

Specifically, in this embodiment, a simulation model of a distributed generation cluster for microgrid is constructed in the RT-LAB, a physical mirror image thereof is realized, and a signal output port thereof is expanded by using a target machine. The simulation model consists of two parts. The first part includes a distributed generation simulation unit of a DC power source inverting three-phase AC in parallel connection with a primary circuit module of the microgrid. The second part includes PWM pulse secondary control systems of respective distributed generations.

In this embodiment, a circuit of the DC power source inverting three-phase AC simulates the distributed generations, and four distributed generations are connected in parallel to form the distributed generation cluster. The power control of the distributed generation is controlled by a PWM pulse of an inverter conversion control module, and the pulse signal is generated by a secondary control module.

Step 2: designing a distributed collaborative control algorithm for the microgrid under the attack of the false data injection based on a DSP.

Specifically, in the microgrid, the distributed generation is accessed to the microgrid through the VSC to supply power to the microgrid, and active power and reactive power of an output of the VSC are controlled by a traditional droop control method:

$$\begin{cases} \omega_i = \omega_{n,i} - m_{p,i} P_i \\ U_{mag,i} = U_{n,i} - n_{q,i} Q_i \end{cases} \qquad (1)$$

In the formula (1), $\omega_i$ and $U_{mag,i}$ are an angular frequency and a voltage of an output of an inverter i respectively, $P_i$ and $Q_i$ are an active power and a reactive power of the output of the inverter i respectively; $m_{p,i}$ and $n_{q,i}$ are active and reactive droop coefficients of the inverter i respectively, which are obtained by a rated value of the inverter; and $\omega_{n,i}$ and $U_{n,i}$ are an angular frequency and a voltage set point of the inverter i respectively.

Droop control will lead to frequency and voltage deviations, so a secondary control is needed to make compensation. The secondary control is intended to restore a frequency and a voltage to a normal working range by adjusting the angular frequency and the voltage set point. Only distributed collaborative control under attack is analyzed in the present application. Thus, a control objective is that: in the case of attack, a secondary control algorithm is designed such that the following formula is satisfied:

$$\lim_{t\to\infty}|\omega_i-\omega_{ref}|=0 \quad (2).$$

In the formula (2), $\omega_i$ is an angular frequency of the $i^{th}$ distributed generation; $\omega_{ref}$ is a reference angular frequency; and t denotes a control time.

In order to achieve the above control objective by using distributed collaborative control, an auxiliary controller needs to be designed to obtain a control input $\omega_{n,i}$ in Formula (2). The Formula (1) is differentiated as:

$$\dot{\omega}_i=\dot{\omega}_{n,i}-m_{p,i}\dot{P}_i=u_i \quad (3).$$

In the formula (3), $\dot{\omega}_i$, $\dot{\omega}_{n,i}$ and $\dot{P}_i$ are differentials of $\omega_i$, $\omega_{n,i}$ and $P_i$; $u_i$ is a control rate of the distributed collaborative control algorithm against the attack of false data injection.

$$u_i=-k_\omega\int[\Sigma_{j\in N_i}a_{i,j}(\omega_i-\omega_j)+b_i(\omega_i-\omega_{ref})]dt-\omega_i \quad (4)$$

in the formula (4), $k_\omega$, $a_{i,j}$, $b_i$ are all control coefficients, $\omega_i$ is an angular frequency of the $i^{th}$ distributed generation, $\omega_j$ is an angular frequency of the $j^{th}$ distributed generation, and $N_i$ is a set of distributed generations collaborating with the distributed generation i; the design of the above control rate is capable of eliminating the influence on the secondary control when the false data injection is a constant.

Furthermore, in the step S3, the OPNET acts as a router for simulating signal transmission and reception among distributed generation controllers (DSPs) to realize physical topology simulation and realize interaction of a frequency collaborative control signal of a distributed generation unit.

Step 3: simulating real-time communication among distributed generations based on OPNET.

Figure 2:
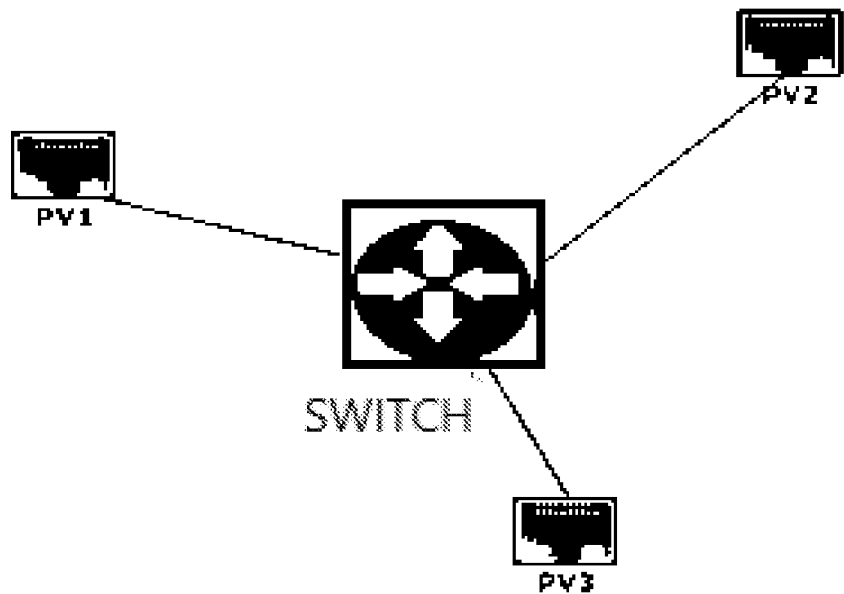
FIG. 2 is an OPNET network simulation model.

Specifically, in this embodiment, the OPNET plays the role of a router, which is used to simulate the transmission and reception of signals among distributed generation controllers (DSPs) to realize physical topology simulation and realize the interaction of frequency signals of the distributed generations. According to the microgrid structure with distributed generations, the OPNET communication topology is designed as shown in FIG. 2. An OPNET software is used to build a communication network among distributed generations and set corresponding communication nodes, which refer to the communication nodes of actual running equipment in distributed generations. Then, the switch receives the operating state data in the DSP controller in real time, sends the data to the OPNET through the communication board card, and participates in the network communication process of the microgrid with distributed generations as an actual node. In this way, the real-time communication among distributed generations is stimulated by the OPNET. The data flow of the communication network mainly includes the actual frequency sent from each distributed generation unit to adjacent distributed generation units.

Step 4: simulating the attack of false data injection to realize distributed collaborative control for microgrid frequency under the attack of false data injection.

Specifically, in an embodiment, the attack value of the secondary control for a microgrid frequency is specified through the platform model, and false data injection is simulated. The AC frequency of each distributed generation is transmitted to the DSP controller through the RT-LAB simulation model, and calculated by the distributed generation frequency secondary control algorithm in the DSP controller. Then, the control signal is transmitted back to the RT-LAB simulation model, thus realizing distributed collaborative control for microgrid frequency under the attack of false data injection.

The solution of the present application is further verified by specific examples below.

Based on the semi-physical simulation platform of RT-LAB, the DSP controller and the OPNET network simulation software, a cyber-physical fusion simulation system is constructed as shown in FIG. 1, and the distributed collaborative control method for microgrid frequency under the attack of false data injection according to the present application is experimentally verified.

Figure 3:
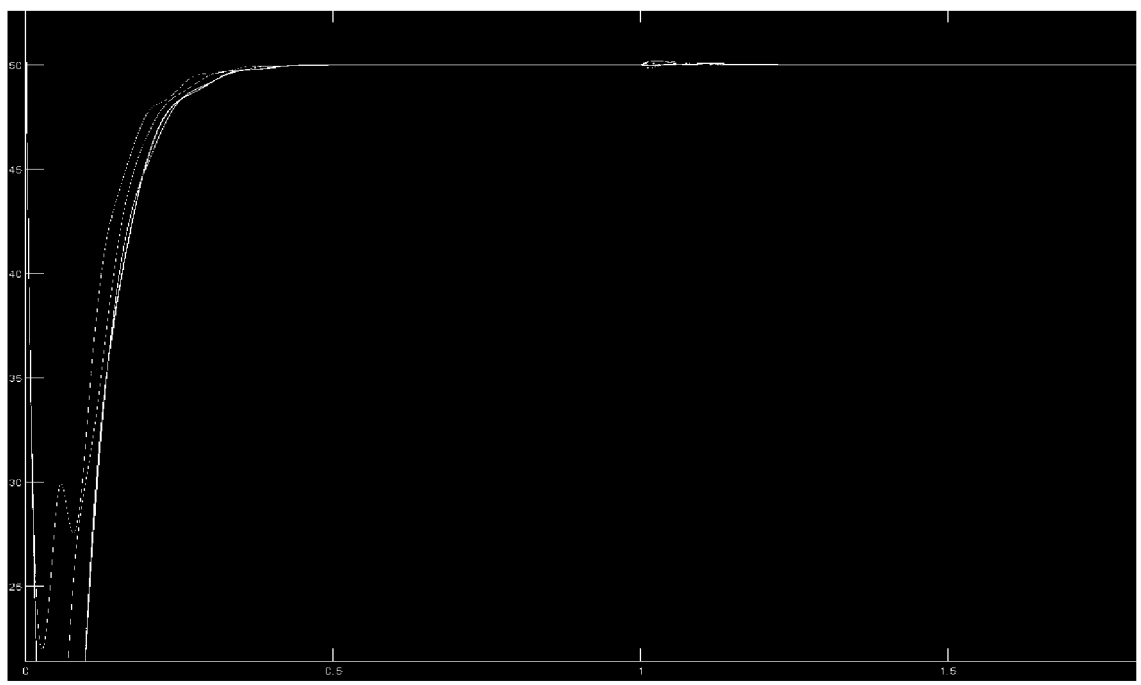
FIG. 3 is an evaluation result for an embodiment of the present application.

The experimental screenshot is shown in FIG. 3, which is the result of distributed collaborative control for microgrid frequency under the attack of false data injection based on cyber-physical fusion according to the embodiment.

In this embodiment, the microgrid is composed of four distributed generators and an AC load. The DC power supply is converted into a three-phase AC to simulate distributed generations, and the PWM pulse input of the converter control module is controlled by the DSP, thereby controlling the active power of distributed output. In the DC-AC inverter module, the inverter inverts 700V DC voltage into 220V AC voltage. When the system is stable, the AC bus frequencies of the four distributed generations are all 50 Hz. The simulation waveforms in FIG. 3 are change curves of the two states, i.e., the state of the frequency at the three-phase AC side of the four distributed generations from start-up to stable operation and the state of the frequency at the three-phase AC side of the four distributed generations from stable operation to false data injection. It can be seen from FIG. 3 that the distributed microgrid receives the attack of false data injection at the time of 1 s, and the control system quickly eliminates the attack, and the four distributed generations resume stable operation at 50 Hz.

The above specific embodiments are used to explain the present application, but not to limit the present application. Any modifications and changes made to the present application within the spirit of the present application and the protection scope of the claims fall into the protection scope of the present application.

What is claimed is:

1. A simulation method of distributed collaborative control for a microgrid frequency under attack of false data injection based on cyber-physical fusion, wherein the simulation method is applied to a scenario of adjusting AC bus frequency of a microgrid composed of distributed generations and AC loads, and comprises following steps:
   S1, establishing a distributed collaborative control simulation model for a microgrid frequency based on a real-time simulation tool OPAL-RT of a real-time simulation platform;
   S2, designing a distributed collaborative control algorithm for a microgrid under the attack of false data injection based on a DSP;
   S3, simulating a real-time communication among distributed generations based on an OPNET;
   S4, simulating constant injection of false data such that the microgrid frequency is strictly tracked to a reference frequency ultimately;
   S5, deploying the distributed collaborative control simulation model and the distributed collaborative control algorithm to a target microgrid under attack of false data injection, and adjusting parameters corresponding to the distributed collaborative control simulation model and the distributed collaborative control algorithm according to operating parameters of the target microgrid, wherein the target microgrid comprises four distributed generations and an AC load; and S6, adjusting active power and voltage of the target microgrid through the distributed collaborative control simulation model and the distributed collaborative control algorithm, in such a manner to adjust AC bus frequency of the four distributed generations of the target microgrid to 50 Hz;

wherein the step S1 specifically comprises:

establishing a simulation model of a distributed generation cluster in the real-time simulation platform, realizing a physical mirror image of the cluster, and using a target machine to expand a signal output port of the cluster, wherein the simulation model includes two parts, a first part is a primary circuit module composed of a distributed generation with a voltage source converter (VSC) and a three-phase AC load of the microgrid, and a second part is a secondary control module composed of a plurality of distributed generation PWM pulse control modules;

wherein in the step S2, the distributed collaborative control algorithm for the microgrid frequency under the attack of false data injection specifically comprises:

in the microgrid, accessing the distributed generations to the microgrid through the VSC to supply power to the microgrid, and controlling active power and reactive power of an output of the VSC by a traditional droop control method;

$$\begin{cases} \omega_i = \omega_{n,i} - m_{p,i} P_i \\ U_{mag,i} = U_{n,i} - n_{q,i} Q_i \end{cases} \quad (1)$$

wherein $\omega_i$ and $U_{mag,i}$ are an angular frequency and a voltage of an output of an inverter i respectively, $P_i$ and $Q_i$ are an active power and a reactive power of the output of the inverter i respectively; $m_{p,i}$ and $n_{q,i}$ are an active droop coefficient and a reactive droop coefficient of the inverter i respectively, which are obtained by a rated value of the inverter; $\omega_{n,i}$ and $U_{n,i}$ are an angular frequency and a voltage set point of the inverter i respectively;

performing a secondary control to compensate for frequency and voltage deviations in a droop control; wherein the secondary control is intended to restore a frequency and a voltage to a normal working range by adjusting the angular frequency and the voltage set point; only distributed collaborative control under attack is analyzed, and a control objective is that in the case of attack, a secondary control algorithm is designed to satisfy a following formula:

$$\lim_{t \to \alpha} |\omega_i - \omega_{ref}| = 0 \quad (2)$$

wherein $\omega_i$ is an angular frequency of the $i^{th}$ distributed generation; $\omega_{ref}$ is a reference angular frequency; and t denotes a control time;

in order to achieve the above control objective by using distributed collaborative control, designing an auxiliary controller to obtain a control input $\omega_{n,i}$ in Formula (2); differentiating the Formula (1) as:

$$\dot{\omega}_i = \dot{\omega}_{n,i} - m_{p,i} \dot{P}_i = u_i \quad (3)$$

wherein $\dot{\omega}_i$, $\dot{\omega}_{n,i}$ and $\dot{P}_i$ are differentials of $\omega_i$, $\omega_{n,i}$ and $P_i$; $u_i$ is a control rate of the distributed collaborative control algorithm against the attack of false data injection;

$$u_i = -k_\omega \int [\Sigma_{j \in N_i} a_{i,j}(\omega_i - \omega_j) + b_i(\omega_i - \omega_{ref})] dt - \omega_i \quad (4)$$

wherein $k_\omega$, $a_{i,j}$, $b_i$ are all control coefficients, $\omega_i$ is an angular frequency of the $i^{th}$ distributed generation, $\omega_j$ is an angular frequency of the $j^{th}$ distributed generation, and $N_i$ is a set of distributed generations collaborating with the distributed generation i; the design of the above control rate is capable of eliminating the influence on the secondary control when the false data injection is a constant.

2. The simulation method of distributed collaborative control for microgrid frequency under the attack of false data injection based on cyber-physical fusion according to claim 1, wherein the step S2 specifically comprises:

acquiring analog quantity from the signal output port of the real-time simulation platform of the secondary control module by the DSP to realize a distributed collaborative control algorithm for the microgrid under the attack of false data injection, wherein a digital signal is uploaded to the secondary control module in the real-time simulation platform through a preset communication protocol.

3. The simulation method of distributed collaborative control for microgrid frequency under the attack of false data injection based on cyber-physical fusion according to claim 1, wherein in the step S3, the OPNET acts as a router for simulating signal transmission and reception among distributed generation controllers (DSPs) to realize physical topology simulation and realize interaction of a frequency collaborative control signal of a distributed generation unit.

4. The simulation method of distributed collaborative control for microgrid frequency under attack of false data injection based on cyber-physical fusion according to claim 1, wherein the step S4 specifically comprises:

specifying a secondary control attack value for the microgrid frequency by a platform model, simulating the false data injection, and transmitting a frequency fluctuation value to a DSP controller by the real-time simulation platform simulation model; performing a distributed generation frequency secondary control algorithm in the DSP controller; transmitting the control signal back to real-time simulation platform simulation model, so as to realize distributed collaborative control for microgrid frequency under the attack of false data injection.

* * * * *